United States Patent
Gasior et al.

(10) Patent No.: US 6,691,166 B1
(45) Date of Patent: Feb. 10, 2004

(54) SYSTEM AND METHOD FOR TRANSFERRING PARTITIONED DATA SETS OVER MULTIPLE THREADS

(75) Inventors: Wojciech Gasior, Dover, MA (US); Aaron Hughes, Hayward, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

(21) Appl. No.: 09/226,864

(22) Filed: Jan. 7, 1999

(51) Int. Cl.[7] ............................................... G06F 15/16
(52) U.S. Cl. .......................................... 709/232; 707/1
(58) Field of Search ................................ 709/100, 200, 709/232, 238, 217, 219, 230, 242; 707/1–10, 100–104

(56) References Cited

U.S. PATENT DOCUMENTS

| | | | |
|---|---|---|---|
| 5,426,645 A | | 6/1995 | Haskin |
| 5,680,400 A | | 10/1997 | York |
| 5,694,602 A | * | 12/1997 | Smith .......................... 709/105 |
| 5,701,484 A | * | 12/1997 | Artsy .......................... 709/303 |
| 5,765,146 A | * | 6/1998 | Wolf et al. ..................... 707/2 |
| 5,933,412 A | * | 8/1999 | Choudhury et al. |
| 5,970,495 A | * | 10/1999 | Baru et al. ................... 707/102 |
| 5,974,416 A | * | 10/1999 | Anand et al. .................. 707/10 |
| 6,105,029 A | * | 8/2000 | Maddalozzo, Jr. et al. ... 707/10 |
| 6,115,705 A | * | 9/2000 | Larson .......................... 707/3 |
| 6,151,632 A | * | 11/2000 | Chaddha et al. ............. 709/231 |
| 6,289,012 B1 | * | 9/2001 | Harrington et al. ......... 370/389 |

OTHER PUBLICATIONS

Watson, Richard W., "The Parallel I/O Architecture of the High–Performance Storage System (HPSS)", At the Forefront of Information Infrastructures, Proceedings of the 14th IEEE Symposium on Monterey, CA, Sep. 11–14, 1995, pp. 27–44, Los Alamitos, CA, USA.

* cited by examiner

Primary Examiner—Zarni Maung
Assistant Examiner—G. L. Opie
(74) Attorney, Agent, or Firm—Kudirka & Jobse, LLP (57) ABSTRACT

In a distributed computer system, a data set having a plurality of data rows is extended by adding an additional column to the data set and assigning a persistent partition ID to each of the plurality of data rows in the additional column. The extended data set can then be queried by a plurality of queries, each of which has conditions that select the same rows from the data set and each of which has different partition ID information. The partition ID information forms a different result set from the selected rows so that the result set of each query forms a non-overlapping, transferable result set partition. Together, the result set partitions form the complete result set. The result set partitions can be transferred in parallel through the computer system to increase the system throughput.

32 Claims, 4 Drawing Sheets

SYSTEM AND METHOD FOR TRANSFERRING PARTITIONED DATA SETS OVER MULTIPLE THREADS

BACKGROUND OF THE INVENTION

The present invention relates, generally, to database retrieval systems and, more particularly, to the partitioning of large data sets for transfer over multi-threaded strands in a parallel load fashion.

Databases represent an important data processing area in many applications. They are often used to store large amounts of information and then efficiently retrieve selected portions of the information. Many present day systems use a client/server database approach in which application programs running in clients access a central database management system (DBMS) located in a database server. In order to access the information in the database efficiently, the clients form queries that request information with selected characteristics. The queries are transmitted to the DBMS server, which retrieves the desired information that meets the characteristics specified in the query. The results (commonly called a "result set") are returned to the clients.

The ability to form queries to request information within the database allows an individual user to query the database for desired information. At other times, however, it is desirable to be able to transfer large blocks of data within the database to a given client or from a client to a given server. The transfer of large blocks of data within a database management system from a client to a server typically can be performed over several possible types of connection systems. One type of system is a simple telephone line hookup, such as a hookup using a modem, where the server dials up the client and proceeds to query the client for the block of data and then have the data transferred via the modem connection, to the server. This system provides a serial data transfer approach and, in view of the limited transfer rates currently achievable in telephonic data communications, can be quite slow.

A second type of transfer can be performed over a networked system within a private network, also known as an intranet, where the client and server are networked together to allow relatively instant communication among the networked members. A communication node connects the client to the server within the network system to form a thread. This system typically is much faster than the modem line of telephonic communication because of the high transfer rates obtainable within a networked system. This "single threaded," or serial transfer, approach to transferring large blocks of data to a requesting server and can still be time consuming during the actual transfer of data because of the serial nature of the transfer.

Another system that provides a database and access to the database to a plurality of users is a wide area network (WAN), which is also within a intranet system. A WAN typically includes multiple communication nodes that allow for multiple connections from one source to another. Rarely, however, multiple connections are utilized by applications to communicate between a client and a server within WAN. Since the full capacity of the network is not fully utilized by the application, the transfer rate is still slow. There is no known method or system that allows a large data set, such as a large portion, if not the entire database, to be transmitted over the plurality of nodes in a parallel manner.

Therefore, there is a need to be able to transfer large data sets across a communication system that has multiple nodes via the multiple nodes. What is needed then is a system or method that enables data to be transferred over multiple nodes in a parallel fashion.

SUMMARY OF THE INVENTION

According to the present invention, a method and system for breaking a data set into a plurality of partitions for transfer over a plurality of communication nodes in parallel. The system comprises a plurality of communication nodes that are coupled to the first and second computer storage locations. Each of the plurality of communication nodes serves as a communication thread. A data transfer controller is coupled to the first computer storage location and the plurality of communication nodes. The data transfer controller selects a number of communication threads to serve as data transfer links between the first and second computer storage location. A data partitioner is also provided that is coupled to the first computer storage location. The data partitioner is responsive to a data set transfer request to partition the data set into transferable data set partitions. The data transfer controller transfers the data set partitions over the communication threads in parallel once the partitions are ready.

In a first embodiment, the data set is partitioned into a number of data set partitions that is equal to the number of selected communication threads. This allows a one-to-one correspondence of data set partitions to the communication threads.

In a second embodiment, the data set is partitioned into a number of data set partitions greater than the number of selected communication threads and are processed not only in parallel over the multiple threads, but also in serial where the faster communication threads are able to handle the added data partitions.

An additional feature of the distributive computer environment is the ability of the data transfer controller to allow access to a transferred data set partition prior to the remaining data set partitions being completely transferred and then reassembled in the original data set. This allows a user to access the data within any data set partition that has been completely transferred prior to actual assembly of the original data set. During the data partitioning, the data partitioner defines each partition based on the number of data rows used within the data set. The data partitioner also divides the data rows between the partitions as evenly as possible without fragmenting any of the data rows between discrete partitions.

The method is utilized within a distributive computer environment that comprises a first computer storage location, a second computer storage location, and a plurality of communication nodes coupling the first and second computer storage locations. The method provides for transferring a data set between the first and second computer storage locations and proceeds as follows. A request is made for a data set, or portion of a data set, to be transferred between the first and second computer storage locations. Once the data set is determined, the process partitions the data set into transferable data set partitions. The process forms a plurality of concurrent communication threads selected from the plurality of communication nodes. Once the partitions have been formed and the communication threads established, the process transfers the data set partitions in parallel over the plurality of communication threads between the first and second computer storage locations. When forming the communication threads, the number of communication threads may be set equal to the number of data set partitions. Likewise, the number of data set partitions may exceed the actual number of communication threads available.

Where the number of data set partitions exceeds the number of communication threads, one partition is transferred over each communication thread in a parallel transfer. As the data set transfer in a partition is completed and the transferring thread becomes available, a next data set partition transfer is performed over the now available communication thread. The ability to perform both parallel and serial transfers of the data set partitions allows for the method to optimize the transfer rate of the partitioned data set based on the number of communication threads available and the varying transfer rates for each communication thread.

The method also allows a user or system to gain access to completely transferred data set partitions prior to the complete transfer of all the data set partitions and their reassembly into the original data set. The data set is comprised of data rows having a total range so that a partition column to mark each data set partition is established, a subrange of data rows to define each data set partition is selected, and the subrange of data rows is assigned to a given data set partition. The subrange of data rows for each data set partition is defined so as not to overlap any other subrange of data rows for any other data set partition. This prevents the fragmentation of data rows between partitions that would otherwise corrupt data. The subrange is selected in such a manner as to provide substantially evenly distributed sizes without exact identical sizes between partitions. Further, the method provides for the reassembly of the data set partitions into the original data set after transfer has been completed.

The present invention further includes a computer program product for use in a distributive computer system, as previously described. The computer program product includes computer program code that operates in a manner similar to that of the method of the present invention. The computer program product allows for software implementation of the invention to be carried out on distributive computer system, such as a LAN or WAN, or the Internet.

BRIEF DESCRIPTION OF THE DRAWINGS

The above and further advantages of the invention may be better understood by referring to the following description in conjunction with the accompanying drawings and which.

DETAILED DESCRIPTION OF THE SPECIFIC EMBODIMENT

Figure 1:
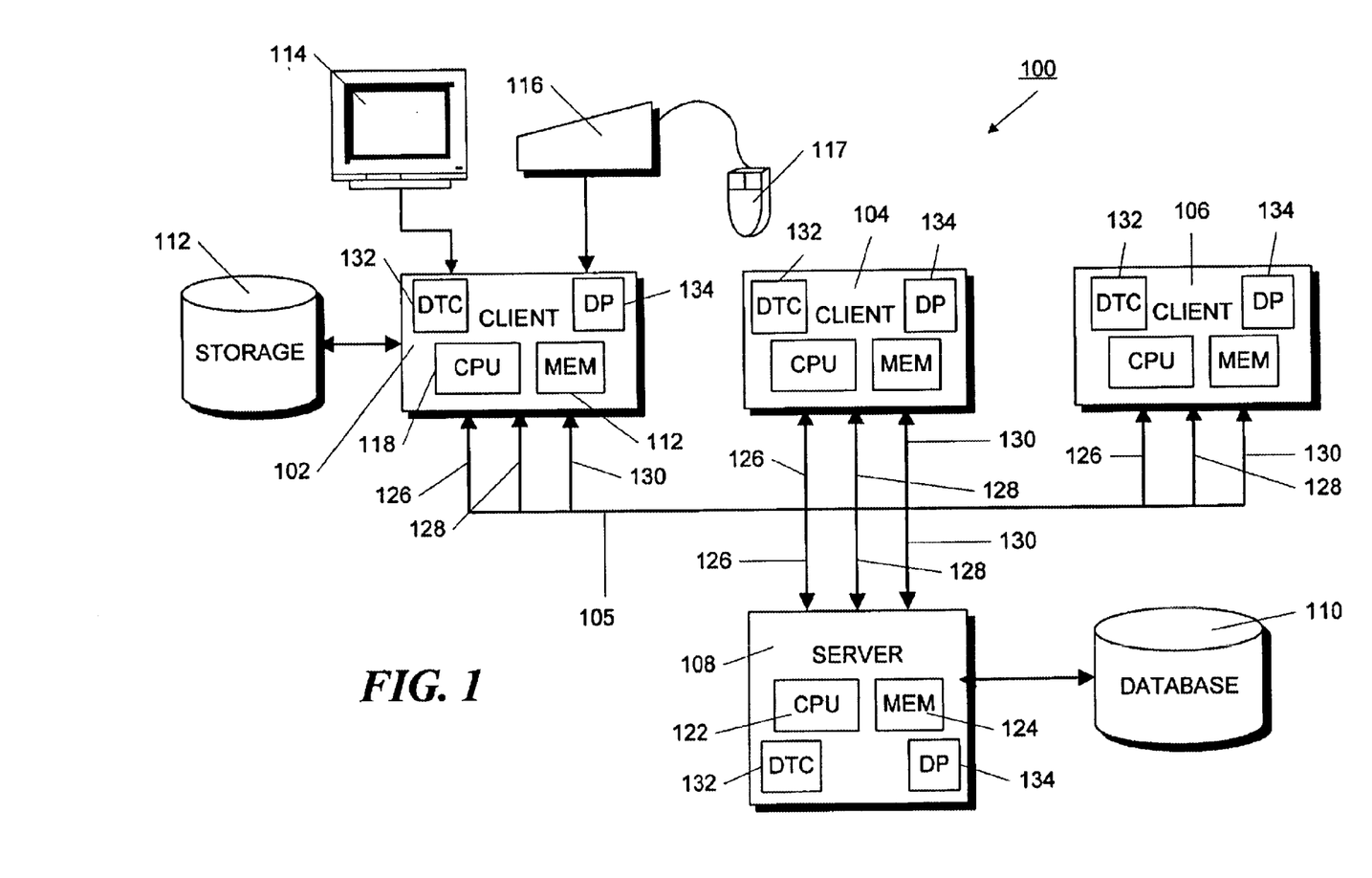
FIG. 1 is a block schematic diagram of a client server system on which the present invention can be operated.

FIG. 1 is a block diagram of a system 100 on which a data set distribution tool constructed according to the present invention can run. As shown, the system 100 is a distributed computing environment comprising a plurality of individual computer nodes 102, 104, 106 and 108. The nodes are functionally organized into clients 102, 104 and 106 and at least one server 108 interconnected over network 105. Each node, whether a client 102, 104, 106 or server 108, is a conventionally programmed digital computer, respectively including a central processing unit (CPU) 118, 122, and a main memory 112, 124 interconnected with the CPU 118, 122. In addition, each client 102–106 and server 108 can include user interfacing devices, such as a monitor 114, keyboard 116, a mouse 117, and a storage device 112 (shown in FIG. 1, by way of example, for just one client 102). The server 108 includes a database 110, such as a relational database, file system or other organized data storage system. Central system bus 105 includes a plurality of communication nodes 126, 128, and 130, which provide communication routes between a client 102–106 and server 108, or between a first and second client 102–106. Finally, the system 100 can include devices for accepting computer-readable storage mediums (not shown) and can be interconnected with the network 105 for exchanging data and control signals transmitted as a computer data signal in a carrier wave.

In the described embodiment, each node 102–108 is a network connectable computer, such as a Sun SparcStation™5 workstation running the Solaris™ operating system, a version of the UNIX® operating system, or an IBM-compatible computer running the Windows NT™ operating system. However, use of the systems and processes described and suggested herein are not limited to a particular computer configuration. SparcStation™ and Solaris™ are trademarks of Sun Microsystems, Inc., Mountain View, Calif. UNIX® is a registered trademark of The Santa Cruz Operation, Santa Cruz, Calif. Windows NT™ is a trademark of Microsoft Corporation, Redmond, Wash.

Each communication node 126–130 is a network transmitter that receives data packets sent from a node 102–108 to another similar node. The network system typically routes data packets based on the fastest path time-wise between the requesting node and the receiving node 102–108. Since a plurality of communication nodes 126–130 is, provided, it is possible to utilize multiple nodes, each node representing a single communications thread, to form a multithread transmission system according to the present invention. System 100 can be a wide area network (WAN) where the application client and the database server are separated by many nodes 126–130, or hops, which have a high net latency.

Further, each node 102–108 can function as a data transfer controller 132 and a data partitioner 134. Data transfer controller 132 establishes the total number of communication threads that may be used to provide parallel transfer of a partitioned data set between selected nodes as well as the actual transfer of the partitions across the threads. The node that is either the transferring or receiving node may serve as either data transfer controller 132, data partitioner 134, or both. Data partitioner 134 slices up the data set to be transferred and also provides for the reassembly of the data set after all partitioned portions of the data set have been successfully transferred to the desired node.

Figure 2:
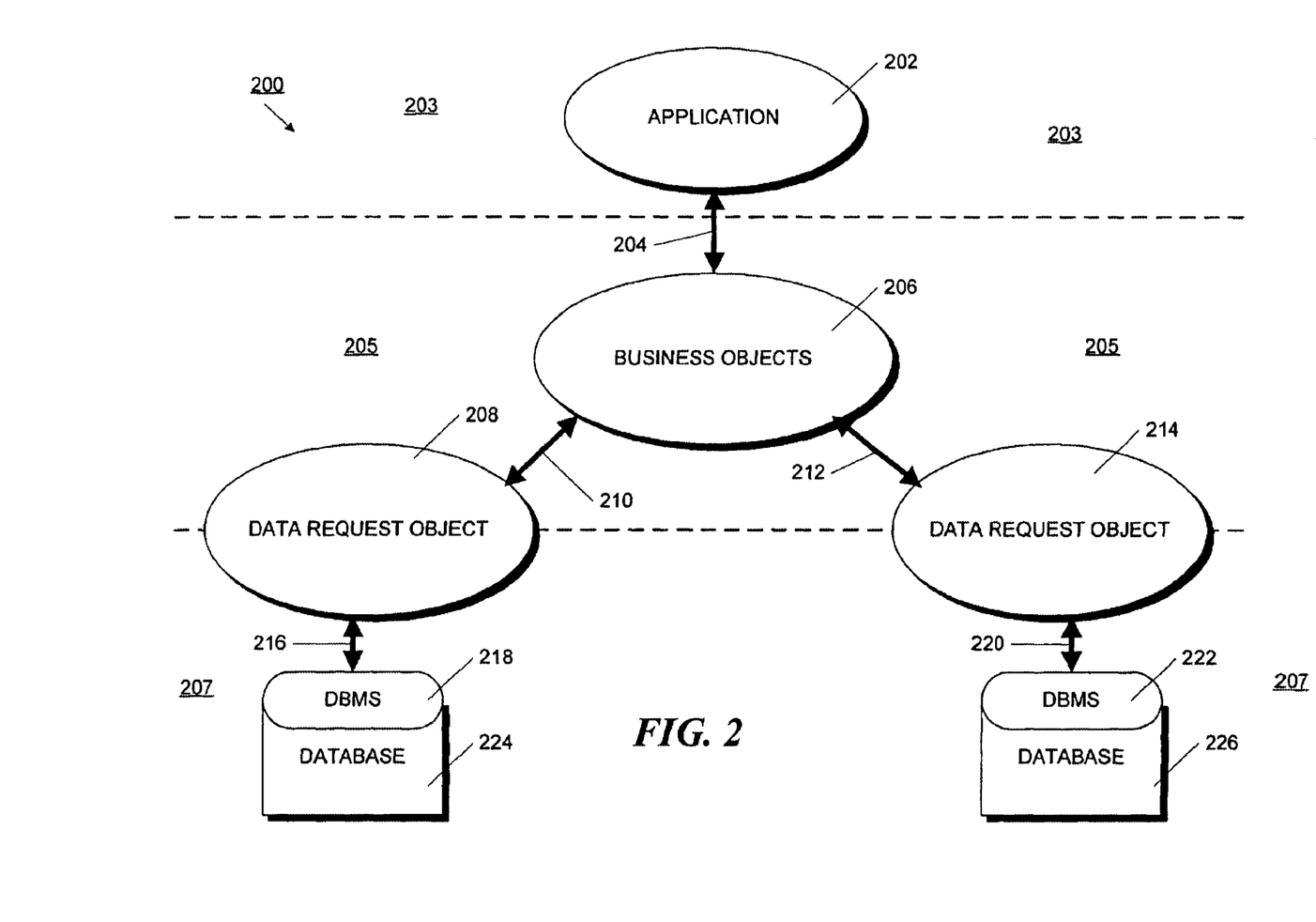
FIG. 2 is a block schematic diagram illustrating the interaction between client object, business objects and query objects in a three-tiered system.

Distributed computing environments can be logically viewed as of a set of cooperating software components, referred to as "objects," being executed on one or more computers interconnected by a network. The individual applications running on each computer can share a set of standard or application-specific objects and executing an application can cause it to interact with and use other software objects available locally and throughout the network. Each such object can, in turn, use other software objects. Thus, an application in a distributed computing environment can consist of the combination of application-specific objects and the combined local and remote objects it uses. When one object calls an operation on another object, the calling object is referred to as the "client" while the called object is referred to as the "server." FIG. 2 is a block schematic diagram of a database client/server environment 200 using data request objects 208 and 214 as might be implemented in the system 100 of FIG. 1. The environment 200 is functionally structured into three tiers. In the top tier 203, a client 102 (shown in FIG. 1) executes an application 202. The application 202 interacts, as indicated schematically by arrow 204, with business logic in the middle tier 205. The business logic is implemented as one or more business objects 206 (only one business object 206 is shown) and, in turn, interfaces with data request objects 208 and 214. Both the business object 206 and the data request objects 208 and 214 can be executed on either a client 102 or a server 108 (shown in FIG. 1). Other combinations and configurations of objects, including business object 206 or data request objects 208 and 214 are feasible.

In the bottom tier 207, a server 108 and an associated database 110 (shown in FIG. 1) include database management systems (DBMS systems) 218 and 222 (which may be executed on the server 108) along with associated databases 224 and 226, respectively. Data request objects 208, 214 allow the business logic implemented in the business object 206 to access the DBMS systems 218, 222.

Although current systems are capable of transferring large data sets uncorrupted over the connections provided within the client/server system, they do so using only a single thread to transfer the data set in a serial manner. What is presented now is a method and system that allows very large and fast loads of data sets from servers, such as, but not limited specifically to, an SQL server that fetches a plurality of rows from a database. The present invention may also be applicable to web-based applications for fetching a large data set over multiple nodes as well.

In one embodiment, system 100 utilizes multiple threads to load the data from any remote DBMS location via a standard ANSI SQL interface. System 100 achieves a reduced overall load time for transferring these large data sets by partitioning the data in the database, creating multiple connections to the database server, and loading each partition in parallel over a plurality of concurrent connections, which takes advantage of the increased throughput offered by parallel transfer.

Each concurrent connection is established through the plurality of nodes 126–130 provided in WAN system 100. In one test, ten concurrent transfer connections produced a transfer rate at least six to seven times the rate of that of a single connection. The ideal transfer rate multiple factor would be n times the rate of a single connection, where n is the actual number of concurrent connections provided; however, there is additional delay inherent in opening multiple connections. The transfer rate delay in each thread used in a multithread connection results from additional transmission overhead needed for the server to establish each connection, maintain the thread, and receive the data being transferred. The transfer speed in a multithreaded transfer is still faster than that of a single thread, even with the delay added to each individual thread.

Further, the system may generate a larger number of partitions than there are transfer threads. A first set of partitions, equal to the number of transfer threads established, are transferred in parallel over the transfer threads. Next, as some threads have a transfer rate faster than other threads, threads that have finished transferring a first partition are then utilized to transfer the remaining data partitions on a first available thread basis. Being able to provide both parallel transfer of the data set as well as serial transfer of a larger number of partitions allows for a faster transfer rate in a system that has a limited number of available communication nodes. Additionally, mixing both parallel and serial transferring of the data partitions over the multiple communication threads optimizes the transfer threads that work the fastest within the system in order to enhance the transfer rate over that of a single node.

The method and system is able to partition the data in the database automatically and independently from the application logic. This allows the system to load or transfer the data set over the multiple threads in parallel and reassemble the results into a single data set giving the impression of a fast single connection. Additionally, reassembly of the original data set before accessing any data in one of the completely transferred data partitions may not be necessary in a multi-threaded application that is designed to process the data in chunks. Specifically, such applications have additional advantages by using parallel multi-thread transfers since it allows the data to be accessed as soon as the transfer of a partition is complete. Thus, once a given partition has been fully transferred, the system can access the data within that partition without waiting for the remaining partitions to finish transferring and then all transmitted partitions are reassembled back as the original data set.

Figure 3:
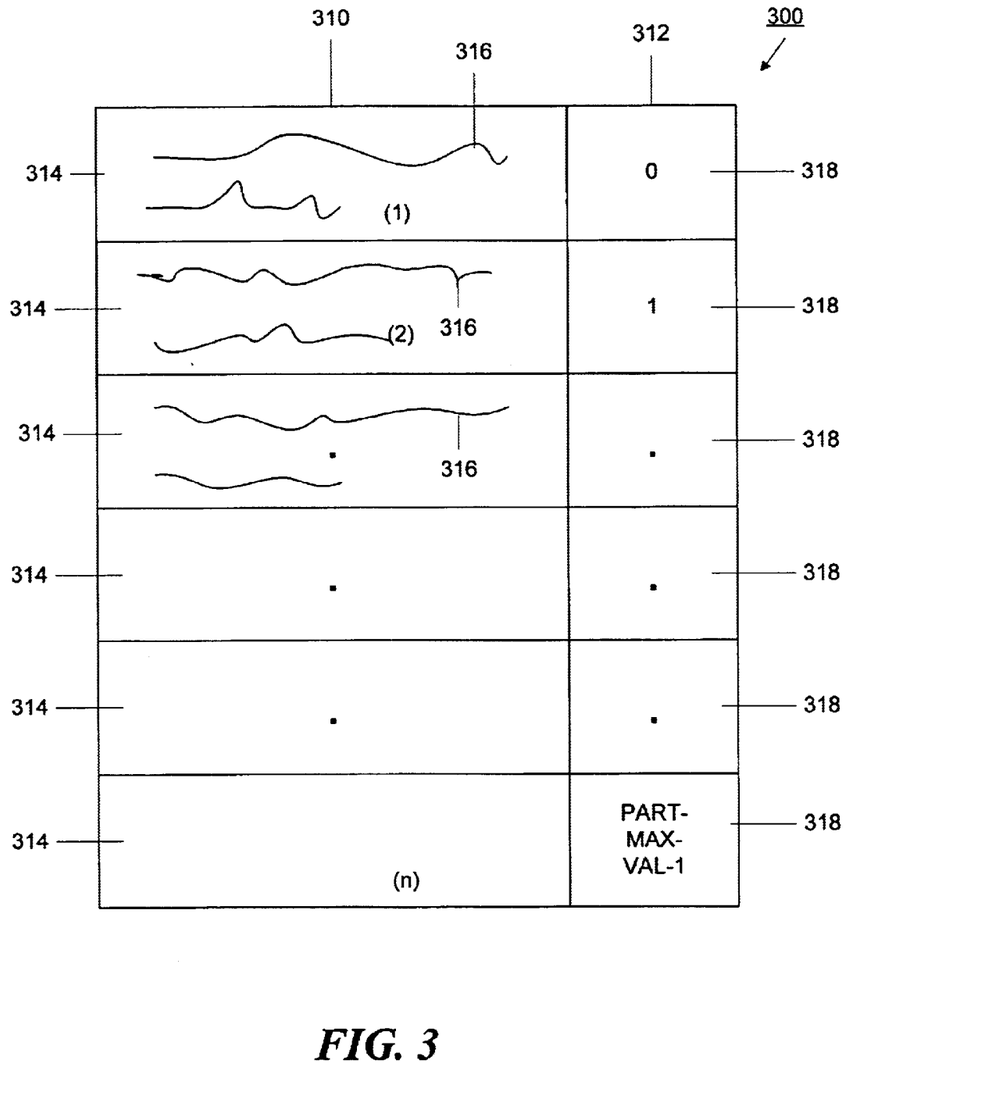
FIG. 3 is a schematic diagram illustrating a mapping table for mapping assorted data rows within a data set into selected partitions for subsequent transfer.

The system and method provides an extension 312 to the application database 300, which is illustrated in FIG. 3. Extension 312 is independent of the application logic and is utilized for the automatic partitioning of data into tables. The database 300, according to the present invention, includes a data set 310, which may include the entire database or a large section of database 300 as stored in database 110 or client 102–106 of FIG. 1. Each data set 310 is composed of a plurality of data rows 316. Extension 312 involves adding a new column 318 called a "partition column." Partition column 318 is used to associate the particular data rows 318 within a defined data set 310 with integer number values. The integer value is stored within partition column 318 to keep track of the particular data rows 316 per defined partition 314. Each partition column 318 has a value range <0, PARTITION_MAX_VAL−1>, where PARTITION_MAX_VAL is a number assigned during the application installation. PARTITION_MAX_VAL represents the maximum number of partitions that would be allowable in the slicing up of the database for transfer over WAN system 100. This number is decided based on the number of nodes that can be utilized as independent communication threads for transferring the partitions parallel to the destination of the partitioned database. An alternative embodiment is contemplated which places the partition numbers in a separate table. When the data set 310 is the result of a SQL join operation involving multiple data tables, all that is necessary to partition the set is the presence of the partition column 312 in any one of the participating tables in the join.

Figure 4:
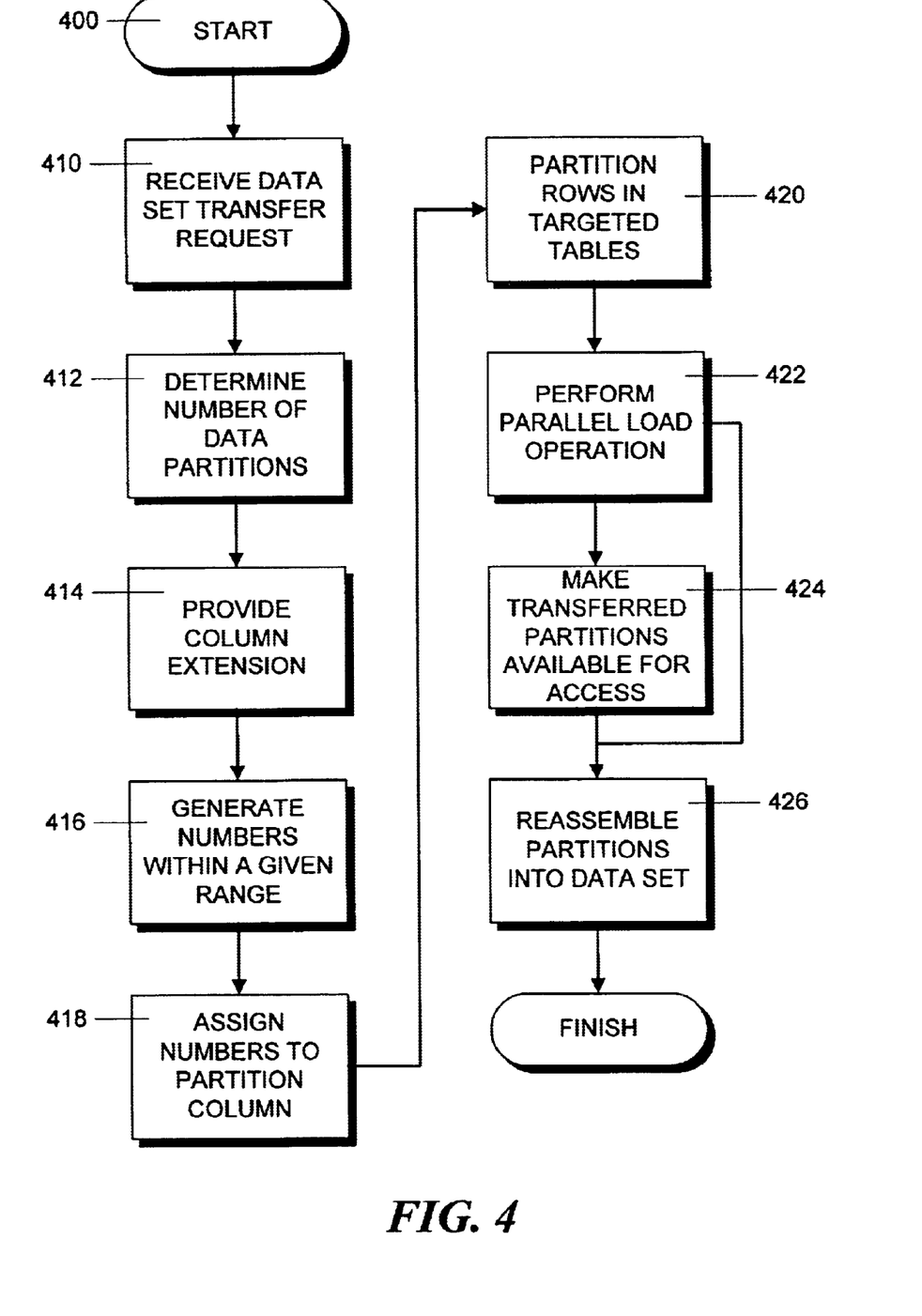
FIG. 4 depicts a flow diagram of the steps utilized in establishing the number of partitions within a data set to be transferred as well as the number of communication threads utilized to perform the transfer of the data set partitions according to the present invention.

The method for establishing the partitions 314 for FIG. 3 is depicted in the block diagram of FIG. 4. The method begins in step 400 and proceeds to step 410 where the request to transfer a data set 310 is received and then preparation is made to fulfill the data set transfer request. In step 412, the system determines the number of partitions needed to transfer the data set 310 over WAN system 100.

The decision to select the number of partitions is based upon the size of the data set to be transferred, the traffic currently being handled by WAN system 100, the maximum time allowable to transfer the set, and the urgency at which the data is needed. Next, in block 414, the system provides an extension 312 that establishes partition column 318.

Next, in block 416, a random number generator produces evenly distributed values in the range <0 to PARTITION_MAX_VAL_-1>. The random number generator can be implemented in the database store procedures or within the application Java code. The random numbers are available in the module creating rows in a database table with partition columns. In block 418, the random values from the given range are assigned to the partition column 318 of the newly created rows. The evenly distributed values need not be precisely equal as data rows 316 are not always of equal length and it is desired that no fragmented data rows 316 occur during partitioning. Although the partition numbers are assigned during the load operation here, alternatively, they can be assigned during the write operation instead.

Using the Java's random ( ) method in the Math class, the integer range is determined as follows:

Int rn=(int) (java.lang.Math.random( )*(double) PARTITION_MAX_VAL);

rn is in the required range <0, PARTITION_MAX_VAL-1>

The system assigns the random values to the partition column whenever a row is created in the targeted table. The application Java or SQL code used to insert rows in the partition tables is modified to include the assignment of random values to partition each column into new rows. The random numbers are helpful in that they assure, with the high probability, that the partitions are divided up in evenly sized units as the population of the rows change. Row population changes during the addition or deletion or other modification of the various rows during application access and manipulation during the intended use of partitioned data set 310.

In step 420, the system partitions rows in targeted tables by calculating the partition column values belonging to the same partitions using the PARTITION_MAX_VAL method and the number of desired partitions. This can be implemented in any SQL server as follows:

```
<0, PARTITION_MAX_VAL - 1>   - the range of random values
N                             - the number of desired partitions
Let P, E, K be integers defined as:
P = PARTITION_MAX_VAL / N;    (note: integer division)
E = P + 1
K = PARTITION_MAX_VAL - P * N;
Let <rI, rM> be: the partition range
Then
    For partitions:
        I = 0, 1, . . ., K - 1
        The range of values is
            <I * E, I * E + P>
            rI = I * E
            rM = I * E + P
    and for remaining partitions:
        I + K, K + 1, . . ., N - 1
        The range of values is
            <I * P + K, I * P + K + P - 1>
            rI = I * P + K
            rM = I * P + K + P - 1
```

Within this procedure, if K>0, the first K partitions are larger and each includes one additional random number value in the range. This has little effect on the row count in partitions if PARTITION_MAX_VAL is sufficiently large. An example is given as follows:

```
For PARTITION_MAX_VAL = 1000000 and N = 7
<0,        999999>    - the entire random number set
<0         142857>    - partition 0
<142858,   285714>    - partition 1
<285715,   428571>    - partition 2
<428572,   571428>    - partition 3
<571429,   714285>    - partition 4
<714286,   857142>    - partition 5
<857143,   999999>    - partition 6
```

Each node 102–108 can serve as multi-thread controller, which is utilized to manage multiple concurrent connections to the database thus serving as the data transfer controller 132. Each node 102–108 is able to dynamically compute partitions based on the number of available connections and, in block 422, perform the parallel load operation of data partitions 314 for transfer from the client to the server or vice versa. Thus, each node 102–108 serves as the data partitioner. As partitions 314 are concurrently loaded, they can be reassembled into one data set 310, if necessary, and handed over for the further processing in the application once received by the requesting server. Once a given partition has been loaded, it can be made accessible to the user as shown in step 424. In step 426, the partitions are reassembled into the original data set after the given partition has been accessed, if requested, and all the remaining partitions have been loaded. Each node 102–108 is able to handle any size partition value desired. For small partition values, the system utilizes a first implementation. For larger partition values, the system uses alternative implementation. The first implementation for very small partitions, a value of 32 and below, but any 2 digit number falls within the very small partition value range, is provided below:

```
for a very small PARTITION_MAX_VAL value
    select . . .
    from . . .
    Where . . .
        (partition = r1 or partition = r2 . . . or partition = rM)
        . . . -- indicates the application specific code.
        Where <r1, rM> is the partition range and r1, r2, . . ., rM
        are consecutive integers in that range.
```

The alternative method for performing partitioning operation is provided as follows:

```
for any PARTITION_MAX_VAL value
    select . . .
    from . . .
    Where . . .
        (partition >= r1 and partition <+ rM)
        . . . -- indicates the application specific code.
        Where <r1, rM> is the partition range.
        r1 and rM are computed as follows:
            rI = I * P + K
            rM = I * P + K + P - 1
```

The very small partition value implementation utilizes indexing on the partitioned column and can be more efficient than the alternative implementation.

A transfer test was performed where node 102–108 was utilized to perform a parallel load operation. The load operation achieved a transfer rate of between 60 to 70 percent of the maximum theoretical speed of the number of connections being utilized. For example, if there are ten concurrent connections, the transfer rate is about seven times faster than is possible over a single connection. The results of the transfer test of a partition utilizing three concurrent connections is given as follows:

```
tanda:wgasior[119]% java PLoad 3
Parallel Load Test: 3 partitions(s)
    _requested 3 partitions
    Starting Timers . . .
    Creating Threads . . .
    Elapsed Time: 2 ms
    _took 2 ms to create partition threads
    Starting Threads . . .
    Joining Threads . . .
    _the main thread is waiting for the partition threads to finish
    loading the data from a database and return the results
    Partition 0 - started: start = 0,        end = 333333
    Partition 1 - started: start = 333334,   end = 666666
    Partition 2 - started: start = 666667,   end = 999999
    _each partition selects all rows in the database having partition
    column values in range <start, end>
Partition 1 - finished: delay = 3313 ms, query = 278 ms, load = 89861 ms;
rows = 1273
Partition 2 - finished: delay = 4096 ms, query = 280 ms, load = 93512 ms,
rows = 1324
Partition 0 - finished: delay = 2376 ms, query = 434 ms, load = 98853 ms;
rows = 1403
    _delay is mainly the time of getting the jdbc connection (before
    actual work)
    query is the time of executing he select statement
    (jdbc execute()).
    load is the time of loading all rows in a given partition
    rows is the number of rows in a given partition
Total Row Count: 4000
    _total rows in all partitions
Total Elapsed Time: 101665 ms
    _the total time to run the entire program
```

As shown in the above example, in order to transfer 4000 rows within a data set, which has been partitioned into three partitions, a total lapse time of 101665 ms results. This elapsed time is faster than a single thread transfer and is shown below. The single thread transfer given below had a total elapse transfer time of 282348 ms. After the example of a single thread used to transfer the desired data set, test examples of partitions ranging from two partitions to ten partitions are given with their overall transfer times posted. It will be seen that the single thread transfer has the slowest time while the ten partitions thread transfer has the fastest total elapse time.

```
One Partition:

tanda:wgasior[117]% java PLoad 1
    Parallel Load Test: 1 partition(s)
    Starting Timers . . .
    Creating Threads . . .
    Elapsed Time: 1 ms
    Starting Threads . . .
    Joining Threads . . .
    Partition 0 - started: start = 0, end = 999999
Partition 0 - finished delay = 1253 ms, query = 430 ms, load = 280661
ms; rows = 4000
    Total Row Count: 4000
    Total Elapsed Time: 282348 ms
Two Partitions:

tanda:wgasior[118]% java PLoad 2
    Parallel Load Test: 2 partition(s)
    Starting Timers . . .
    Creating Threads . . .
    Elapsed Time: 1 ms
    Starting Threads . . .
    Joining Threads . . .
    Partition 0 - started: start = 0,         end = 499999
    Partition 1 - started: start = 500000,    end = 999999
Partition 1 - finished delay = 2074 ms, query = 281 ms, load = 137183
ms; rows = 1951
Partition 0 - finished delay = 1109 ms, query = 440 ms, load = 143795
ms; rows = 2049
    Total Row Count: 4000
    Total Elapsed Time: 145346 ms
Three Partitions:

tanda:wgasior[119]%
    tanda:wgasior[119]% java PLoad 3
    Parallel Load Test: 3 partition(s)
    Starting Timers . . .
    Creating Threads . . .
    Elapsed Time: 2 ms
    Starting Threads . . .
    Joining Threads . . .
    Partition 0 - started: start = 0          end = 333333
    Partition 1 - started: start = 333334,    end = 666666
    Partition 2 - started: start = 666667,    end = 999999
Partition 1 - finished delay = 3313 ms, query = 278 ms, load = 89861 ms,
rows = 1273
Partition 2 = finished delay = 4096 ms, query = 280 ms, load = 93512 ms;
rows - 1324
Partition 0 - finished delay = 2376 ms, query = 434 ms, load = 98853 ms;
rows = 1403
    Total Row Count: 4000
    Total Elapsed Time: 101665 ms
Four Partitions:

tanda:wgasior[120]% java Pload 4
    Parallel Load Test: 4 partition(s)
    Starting Timers . . .
    Creating Threads . . .
    Elapsed Time: 1 ms
    Starting Threads . . .
    Joining Threads . . .
    Partition 0 - started: start = 0,         end = 249999
    Partition 1 - started: start = 250000,    end = 499999
    Partition 2 - started: start = 500000,    end = 749999
```

Partition 3 - started: start = 750000, end = 999999
Partition 2 - finished: delay = 3230 ms, query = 279 ms, load = 68986 ms; rows = 977
Partition 3 - finished: delay = 4053 ms, query = 402 ms, load = 68849 ms; rows = 974
Partition 1 - finished: delay = 2268 ms, query = 278 ms, load = 71166 ms; rows = 1003
Partition 0 - finished: delay = 1398 ms, query = 436 ms, load = 73751 ms; rows = 1046
    Total Row Count: 4000
    Total Elapsed Time: 75588 ms
Five Partitions:

tanda:wgasior[121]% java PLoad 5
    Parallel Load Test: 5 partition(s)
    Starting Timers . . .
    Creating Threads . . .
    Elapsed Time: 1 ms
    Starting Threads . . .
    Joining Threads . . .
    Partition 0 - started: start = 0, end = 199999
    Partition 1 - started start = 200000, end = 399999
    Partition 2 - started start = 400000, end = 599999
    Partition 3 - started start = 600000, end = 799999
    Partition 4 - started start = 800000, end = 999999
Partition 2 - finished: delay = 2869 ms, query = 279 ms, load = 53344 ms; rows = 747
Partition 3 - finished: delay = 3874 ms, query = 280 ms, load = 55950 ms; rows = 786
Partition 1 - finished: delay = 1996 ms, query = 280 ms, load = 58800 ms; rows = 827
Partition 0 - finished: delay = 1119 ms, query = 442 ms, load = 59976 ms; rows = 842
Partition 4 - finished: delay = 4640 ms, query = 281 ms, load = 56906 ms; rows = 798
    Total Row Count: 4000
    Total Elapsed Time: 61829 ms
Six Partitions:

tanda:wgasior[122]% java PLoad6
    Parallel Load Test: 6 partition(s)
    Starting Timers . . .
    Creating Threads . . .
    Elapsed Time: 1 ms
    Starting Threads . . .
    Joining Threads . . .
    Partition 0 - started: start = 0, end = 166666
    Partition 1 - started: start = 166667, end = 333333
    Partition 2 - started: start = 333334, end = 500000
    Partition 3 - started: start = 500001, end = 666667
    Partition 4 - started: start = 666668, end = 833333
    Partition 5 - started: start = 833334, end = 999999
Partition 3 - finished: delay = 3804 ms, query = 277 ms, load = 44795 ms; rows = 627
Partition 2 - finished: delay = 3018 ms, query = 286 ms, load = 46287 ms; rows = 646
Partition 0 - finished: delay = 1308 ms, query = 437 ms, load = 49973 ms; rows = 701
Partition 4 - finished: delay = 4594 ms, query = 279 ms, load = 47290 ms; rows = 662
Partition 1 - finished: delay = 2234 ms, query = 279 ms, load = 50069 ms; rows = 702
Partition 5 - finished: delay = 5375 ms, query = 281 ms, load = 47479 ms; rows = 662
    Total Row Count: 4000
    Total elapsed Time: 53138 ms
Seven Partitions:

tanda:wgasior[123]% java PLload 7
    Parallel Load Test: 7 partition(s)
    Starting Timers . . .
    Creating Threads . . .
    Elapsed Time: 2 ms
    Starting Threads . . .
    Joining Threads . . .
    Partition 0 - started: start = 0, end = 142857
    Partition 1 - started: start = 142858, end = 285714
    Partition 2 - started: start = 285715, end = 428571
    Partition 3 - started: start = 428572, end = 571428
    Partition 4 - started: start = 571429, end = 714285
    Partition 5 - started: start = 714286, end = 857142
    Partition 6 - started: start = 857143, end = 999999
Partition 3 - finished: delay = 3568 ms, query = 282 ms, load = 37341 ms; rows = 517
Partition 1 - finished: delay = 1957 ms, query = 277 ms, load = 42125 ms; rows = 586
Partition 0 - finished: delay = 1117 ms, query = 439 ms, load = 43081 ms; rows = 599
Partition 2 - finished: delay = 2781 ms, query = 278 ms, load = 42408 ms; rows = 589
Partition 6 - finished: delay = 5998 ms, query = 283 ms, load = 39964 ms; rows = 554
Partition 4 - finished: delay = 4341 ms, query = 278 ms, load = 41839 ms; rows = 581
Partition 5 - finished: delay = 5128 ms, query = 282 ms, load = 41499 ms; rows = 574
    Total Row Count: 4000
    Total Elapsed Time: 46912 ms
Eight Partitions     tanda:wgasior[124]% java PLoad 8
    Parallel Load Test: 8 partition(s)
    Starting Timers . . .
    Creating Threads . . .
    Elapsed Time: 2 ms
    Starting Threads . . .
    Joining Threads . . .
    Partition 0 - started: start = 0, end = 124999
    Partition 1 - started: start = 125000, end = 249999
    Partition 2 - started: start = 250000, end = 374999
    Partition 3 - started: start = 375000, end = 499999
    Partition 4 - started: start = 500000, end = 624999
    Partition 5 - started: start = 625000, end = 749999
    Partition 6 - started: start = 750000, end = 874999
    Partition 7 - started: start = 875000, end = 999999
Partition 3 - finished: delay = 3718 ms, query = 281 ms, load = 33849 ms; rows = 466
Partition 4 - finished: delay = 4486 ms, query = 278 ms, load = 33419 ms; rows = 460
Partition 0 - finished: delay = 1290 ms, query = 434 ms, load = 37526 ms; rows = 518
Partition 1 - finished: delay = 2158 ms, query = 280 ms, load = 38303 ms; rows = 528
Partition 7 - finished: delay = 6921 ms, query = 277 ms, load = 34587 ms; rows = 477
Partition 2 - finished: delay = 2943 ms, query = 276 ms, load = 38879 ms; rows = 537
Partition 6 - finished: delay = 6145 ms, query = 294 ms, load = 35982 ms; rows = 497
Partition 5 - finished: delay = 5274 ms, query = 285 ms, load = 37516 ms; rows = 517
    Total Row Count: 4000
    Total Elapsed Time: 43078 ms
Nine Partitions:

tanda:wgasior[125]% java PLoad 9
    Parallel Load Test: 9 partition(s)
    Starting Timers . . .
    Creating Threads . . .
    Elapsed Time: 2 ms
    Starting Threads . . .
    Joining Threads . . .
    Partition 0 - started: start = 0, end = 11111
    Partition 1 - started: start = 111112, end = 22222
    Partition 2 - started: start = 222223, end = 333333
    Partition 3 - started: start = 333334, end = 444444
    Partition 4 - started: start = 444445, end = 555555
    Partition 5 - started: start = 555556, end = 666666
    Partition 6 - started: start = 666667, end = 777777
    Partition 7 - started: start = 777778, end = 888888
    Partition 8 - started: start = 888889, end = 999999
Partition 4 - finished: delay = 4282 ms, query = 284 ms, load = 30014 ms; rows = 406
Partition 3 - finished: delay = 3524 ms, query = 277 ms, load = 31543 ms; rows = 428
Partition 0 - finished delay = 1117 ms, query = 446 ms, load = 34725 ms; rows = 471
Partition 1 - finished delay = 1932 ms, query = 281 ms, load = 34593 ms;

```
-continued rows = 470
Partition 2 - finished delay = 2757 ms, query = 280 ms, load = 34124 ms;
rows = 462
Partition 5 - finished delay = 5172 ms, query = 289 ms, load = 32478 ms;
rows = 439
Partition 8 - finished delay = 7635 ms, query = 281 ms, load = 31267 ms;
rows = 422
Partition 7 - finished delay = 6865 ms, query = 279 ms, load = 32822 ms;
rows = 443
Partition 6 - finished delay = 6034 ms, query = 283 ms, load = 33880 ms;
rows = 459
    Total Row Count: 4000
    Total Elapsed Time: 40199 ms
Ten Partitions:

tanda:wgasior[126]% java PLoad 10
    Parallel Load Test: 10 partition(s)
    Starting Timers . . .
    Creating Threads . . .
    Elapsed Time: 3 ms
    Starting Threads . . .
    Joining Threads . . .
    Partition 0 - started: start = 0,              end = 99999
    Partition 1 - started: start = 100000,         end = 199999
    Partition 2 - started: start = 200000,         end = 299999
    Partition 3 - started: start = 300000,         end = 399999
    Partition 4 - started: start = 400000,         end = 499999
    Partition 5 - started: start = 500000,         end = 599999
    Partition 6 - started: start = 600000,         end = 699999
    Partition 7 - started: start = 700000,         end = 799999
    Partition 8 - started: start = 800000,         end = 899999
    Partition 9 - started: start = 900000,         end = 999999
Partition 1 - finished: delay = 2054 ms, query = 281 ms, load = 30277 ms;
rows = 408
Partition 4 - finished: delay = 4544 ms, query = 284 ms, load = 28206 ms;
rows = 380
Partition 5 - finished: delay = 5452 ms, query = 281 ms, load = 27309 ms;
rows = 367
Partition 2 - finished: delay = 2818 ms, query = 277 ms, load = 29958 ms;
rows = 404
Partition 0 - finished: delay = 1176 ms, query = 441 ms, load = 32200 ms;
rows = 434
Partition 3 - finished: delay = 3681 ms, query = 278 ms, load = 31292 ms;
rows = 423
Partition 6 - finished: delay = 6243 ms, query = 287 ms, load = 28825 ms;
rows = 386
Partition 7 - finished: delay = 7088 ms, query = 284 ms, load = 29758 ms;
rows = 400
Partition 9 - finished: delay = 8736 ms, query = 314 ms, load = 28869 ms;
rows = 389
Partition 8 - finished: delay = 7915 ms, query = 285 ms, load = 30348 ms;
rows = 409
    Total Row Count: 4000
    Total Elapsed time: 38550 ms
```

The preceding examples list eleven tests of varying partitions. The first example was that of a three partition transfer over three threads. The next ten examples were subsequent successive examples of 1–10 partitions for each division. In each partition, 4000 rows of data were used. Each example also uses a different number of node connections depending upon the number of partitions required being performed.

A software implementation of the above-described embodiment may comprise a series of computer instructions either fixed on a tangible medium, such as a computer readable media, e.g. a diskette, a CD-ROM, a ROM memory, or a fixed disk, or transmissible to a computer system, via a modem or other interface device over a medium. The medium can be either a tangible medium, including, but not limited to, optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, although the description was directed to a particular hardware system and operating system, other hardware and operating system software could be used in the same manner as that described. Other aspects, such as the specific instructions utilized to achieve a particular function, as well as other modifications to the inventive concept are intended to be covered by the appended claims.

What is claimed is:

1. A distributive computer system for transferring a data set having a plurality of data rows between a first computer storage location and a second computer storage location, the system comprising:

a plurality of communication nodes, coupling the first and second computer storage locations, each of the plurality of communication nodes serving as a communication thread;

a data transfer controller, coupled to the first or second computer storage location and the plurality of communication nodes, to select a number of communication threads to serve as data transfer links between the first and second computer storage location;

a data partitioner, coupled to the first computer storage location, that extends the data set by adding an additional column to the data set and assigning a persistent partition ID to each of the plurality of data rows in the additional column; and a selection mechanism responsive to a plurality of queries against the data set, wherein each query has conditions that select the same rows from the data set and each query has partition ID information that forms a different result set from the selected rows so that the result set of each query forms a transferable data set partition and wherein the data transfer controller transfers the data set partitions over the communication threads in parallel.

2. The distributive computer system according to claim 1 wherein the data set is partitioned into a number of data set partitions equal to the number of selected communication threads.

3. The distributive computer system according to claim 1 wherein the data set is partitioned into a number of data set partitions greater than the number of selected communication threads.

4. The distributive computer system according to claim 3 wherein a first set of the data set partitions equal to the number of selected communication threads are transferred over the communication threads in parallel and any remaining data set partitions are transferred via communication threads that have completed transferring a corresponding portion of the first set of data set partitions such that some of the data set partitions are transferred serially over the parallel communication threads.

5. The distributive computer system according to claim 1 wherein the data transfer controller allows access to a transferred data set partition prior to complete transfer of all data set partitions.

6. The distributive computer system according to claim 1 wherein the data partitioner defines a partition based on a range of partition IDs assigned to data rows used to define the data set.

7. The distributive computer system according to claim 1 wherein the distributive computer system comprises a wide area network.

8. The distributive computer system according to claim 1 wherein the distributive computer system comprises an internet system.

9. The distributive computer system according to claim 1 wherein the data partitioner comprises a mechanism that assigns a different random number to each of the plurality of data rows as a persistent partition ID.

10. The distributive computer system according to claim 9 wherein the selection mechanism comprises means for selecting data rows from the data set that satisfy the query and whose assigned random number falls within a number range associated with a data partition.

11. In a distributive computer system comprising a first computer storage location, a second computer storage location, a plurality of communication nodes coupling the first and second storage locations, a method for transferring a data set having a plurality of data rows between the first and second computer storage locations, the method comprising:

extending the data set by adding an additional column to the data set and assigning a persistent partition ID to each of the plurality of data rows in the additional column;

selecting data rows from the data set in response to a plurality of queries against the data set, wherein each query has conditions that select the same rows from the data set and each query has partition ID information that forms a different result set from the selected rows so that the result set of each query forms a transferable data set partition;

forming a plurality of concurrent communication threads selected from the plurality of communication nodes; and transferring the data set partitions in parallel over the plurality of communication threads between the first and second computer storage locations.

12. The method according to claim 11 wherein the communication thread forming step comprises selecting N communication threads, where N is the number of data set partitions.

13. The method according to claim 11 wherein the communication thread forming step comprises selecting N communication threads, where N is less than the number of data set partitions.

14. The method according to claim 13 wherein the transferring step comprises:

transferring N data set partitions over the N communication threads in a parallel transfer, where one data set partition is assigned to one communication thread; as each of the N communication threads becomes available, assigning the remaining data set partitions to the available communication threads for transfer so as to optimize the transfer rate of the partitioned data set.

15. The method according to claim 11 further comprising granting access to a completely transferred data set partition prior to the complete transfer of all the data set partitions.

16. The method according to claim 11 wherein the data set is comprised of data rows having a total range and the partitioning step further comprises:

defining a partition column to hold a persistent partition ID for each data row;

inserting into the partition column a partition ID number for each data row;

selecting a subrange of partition ID numbers to define each data set partition; and assigning the data rows whose partition ID numbers fall within a selected subrange of partition ID numbers to a given data set partition.

17. The method according to claim 16 wherein each subrange of partition ID numbers corresponding to each data set partition does not overlap any other subrange of partition ID numbers corresponding to any other data set partition.

18. The method according to claim 16 wherein the subrange selecting step comprises producing substantially evenly distributed partition ID number values to define each subrange within the total range.

19. The method according to claim 11 further comprising reassembling the data set partitions into the data set.

20. The method according to claim 11 wherein the step of assigning a persistent partition ID to each of the plurality of data rows comprises assigning a different random number to each of the plurality of data rows as a persistent partition ID.

21. The method according to claim 20 wherein the step of selecting data rows from the data set comprises selecting data rows from the data set that satisfy the query and whose assigned random number falls within a number range associated with a data partition.

22. A computer program product for use in a distributive computer system comprising a first computer storage location, a second computer storage location, a plurality of communication nodes coupling the first and second storage locations, the computer program product providing program code for transferring a data set having a plurality of data rows between the first and second computer storage locations and comprising a computer usable medium having computer readable program code thereon, including:

computer program code for extending the data set by adding an additional column to the data set and assigning a persistent partition ID to each of the plurality of data rows in the additional column;

computer program code for selecting data rows from the data set in response to a plurality of queries against the data set, wherein each query has conditions that select the same rows from the data set and each query has partition ID information that forms a different result set from the selected rows so that the result set of each query forms a transferable data set partition;

computer program code for forming a plurality of concurrent communication threads selected from the plurality of communication nodes; and computer program code for transferring the data set partitions in parallel over the plurality of communication threads between the first and second computer storage locations.

23. The computer program product of claim 22 wherein the computer program code for forming a plurality of communication threads selects N communication threads, where N is the number of data set partitions.

24. The computer program product of claim 22 wherein the computer program code for forming the plurality of communication threads selects N communication threads, where N is less than the number of data set partitions.

25. The computer program product of claim 24 wherein the transferring computer program code comprises:

computer program code for transferring N data set partitions over the N communication threads in a parallel transfer, where one data set partition is assigned to one communication thread;

computer program code for assigning the remaining data set partitions to the available communication threads for transfer so as to optimize the transfer rate of the partitioned data set as each of the N communication threads becomes available.

26. The computer program product of claim 22 further comprising granting access to a completely transferred data set partition prior to the complete transfer of all the data set partitions.

27. The computer program product of claim 22 wherein the data set is comprised of data rows having a total range and the partitioning computer program code further comprises:

computer program code for defining a partition column to hold a persistent partition ID for each data row;

computer program code for inserting into the partition column a partition ID number for each data row;

computer program code for selecting a subrange of partition ID numbers to define each data set partition;

computer program code for assigning data rows whose partition ID numbers fall within a selected subrange of partition ID numbers to a given data set partition.

28. The computer program product of claim 27 wherein each subrange of partition ID numbers corresponding to each data set partition does not overlap any other subrange of partition ID numbers corresponding to any other data set partition.

29. The computer program product of claim 27 wherein the subrange selecting computer program code comprises computer program code for producing substantially evenly distributed partition ID number values to define each subrange within the total range.

30. The computer program product of claim 22 further comprising computer program code for reassembling the data set partitions into the data set.

31. The computer program product according to claim 22 wherein the computer program code for assigning a persistent partition ID to each of the plurality of data rows comprises computer program code for assigning a different random number to each of the plurality of data rows as a persistent partition ID.

32. The computer program product according to claim 31 wherein the computer program code for selecting data rows from the data set comprises computer program code for selecting data rows from the data set that satisfy the query and whose assigned random number falls within a number range associated with a data partition.

* * * * *